(12) United States Patent
Yang et al.

(10) Patent No.: US 12,457,947 B2
(45) Date of Patent: Nov. 4, 2025

(54) IRRIGATION SYSTEM AND METHOD BASED ON COMPUTER VISION MONITORING

(71) Applicants: TIANJIN CHENGJIAN UNIVERSITY, Tianjin (CN); XI'AN UNIVERSITY OF ARCHITECTURE AND TECHNOLOGY, Xi'an (CN)

(72) Inventors: Bin Yang, Tianjin (CN); Xiao Wang, Tianjin (CN); Dacheng Jin, Tianjin (CN)

(73) Assignees: TIANJIN CHENGJIAN UNIVERSITY, Tianjin (CN); XI'AN UNIVERSITY OF ARCHITECTURE AND TECHNOLOGY, Xi'an (CN)

( * ) Notice: Subject to any disclaimer, the term of this patent is extended or adjusted under 35 U.S.C. 154(b) by 601 days.

(21) Appl. No.: 17/901,322

(22) Filed: Sep. 1, 2022

(65) Prior Publication Data
US 2023/0301252 A1    Sep. 28, 2023

(30) Foreign Application Priority Data
Mar. 23, 2022    (CN) .......................... 202210289568.4

(51) Int. Cl.
*A01G 25/16*    (2006.01)
*G01N 33/00*    (2006.01)
(Continued)

(52) U.S. Cl.
CPC ....... *A01G 25/167* (2013.01); *G01N 33/0098* (2013.01); *G01N 33/24* (2013.01);
(Continued)

(58) Field of Classification Search
CPC .. A01G 25/167; G01N 33/0098; G01N 33/24; G01N 33/245; G01W 1/02; G06V 10/56; G06V 10/764; G06V 20/188
See application file for complete search history.

(56) References Cited

U.S. PATENT DOCUMENTS

| 5,229,937 A * | 7/1993 | Evelyn-Veere | A01G 25/16 239/69 |
| 7,403,840 B2 * | 7/2008 | Moore | A01G 25/16 700/282 |

(Continued)

*Primary Examiner* — Mohammad Ali
*Assistant Examiner* — Sheela Rao
(74) *Attorney, Agent, or Firm* — Hemisphere Law, PLLC; Zhigang Ma

(57) ABSTRACT

An irrigation system and a method based on computer vision monitoring are provided. The system includes a collector, an analyzer, a controller, and irrigation equipment. The collector includes weather sensors for collecting weather information, monitoring sensors for collecting plant images, plant information sensors for collecting plant transpiration rates and leaf thicknesses, and soil sensors for collecting soil moisture information. The analyzer is used to analyze the plant images, the plant transpiration rates and the leaf thicknesses to obtain a plant type and a plant growth state, determine an irrigation scheme according to the weather information, the soil moisture information, the plant type, the plant growth state and a preset irrigation rule. The controller is used to regulate the irrigation equipment according to the irrigation scheme. It can improve the utilization rate of water resources and adopt an accurate and reasonable irrigation system.

9 Claims, 2 Drawing Sheets

(51) Int. Cl.
  *G01N 33/24* (2006.01)
  *G01W 1/02* (2006.01)
  *G06V 10/56* (2022.01)
  *G06V 10/764* (2022.01)
  *G06V 20/10* (2022.01)

(52) U.S. Cl.
  CPC .............. *G01W 1/02* (2013.01); *G06V 10/56* (2022.01); *G06V 10/764* (2022.01); *G06V 20/188* (2022.01); *G01N 33/245* (2024.05)

(56) References Cited

U.S. PATENT DOCUMENTS

| | | | |
|---|---|---|---|
| 9,417,224 B1 * | 8/2016 | Shah | G06Q 10/10 |
| 2010/0032495 A1 * | 2/2010 | Abts | A01G 25/092 |
| | | | 239/69 |
| 2018/0039243 A1 * | 2/2018 | Bangalore | A01G 25/16 |

* cited by examiner

IRRIGATION SYSTEM AND METHOD BASED ON COMPUTER VISION MONITORING

TECHNICAL FIELD

The disclosure relates to the field of agricultural irrigation, and more particularly to an irrigation system and a method based on computer vision monitoring.

BACKGROUND

With the growing contradiction between supply and demand of water resources, all countries attach great importance to the development of water-saving planting industry. China is a country relatively short of water resources, and a per capita share of water resources is only one quarter of the world average.

At present, China is in a stage of shifting from traditional to modern technology. At this stage, how to achieve rapid and orderly development, improve resource utilization, improve efficiency, and achieve an agricultural development mode adapted to modern society has become a problem that needs to be solved. With the development of science and technology, more and more scientific tools based on machine vision and image processing are used in the field of intelligent agriculture. Based on the Internet of Things technology, high-precision soil temperature and humidity sensors and intelligent weather stations are used to collect soil moisture and weather information remotely and online, so as to realize automatic drought preparation, intelligent decision-making of irrigation water consumption, remote or automatic control of irrigation equipment and other functions.

The existing irrigation technology has major defects, such as:
(1) the existing irrigation technology needs a large amount irrigation water, but the utilization rate of water resources is very low;
(2) the automation degree of farmland irrigation in China is very low, and the reliability of equipment is not high in the process of putting into use;
(3) there are also some problems in the informatization of irrigation system, the most important problem is that the designed system cannot intelligently analyze irrigation conditions of plants and judge whether to implement irrigation decisions based on conditions; and
(4) for some areas with complex geological conditions, there are great differences in the degree of drought and insect damage, so that the irrigation accuracy is relatively low.

SUMMARY

In order to solve the above problems in the related art, the disclosure provides an irrigation system and a method based on computer vision monitoring, which can monitor and identify the state of plants, improve the utilization rate of water resources in combination with real-time climate conditions and soil conditions, adopt accurate and reasonable irrigation schedule, and intelligently control irrigation to reduce irrigation labor, reduce management costs, and significantly improve benefits.

The disclosure is realized by the following technical solutions.

An irrigation system based on computer vision monitoring, which includes a collector, an analyzer, a controller, and irrigation equipment.

The collector includes weather sensors, monitoring sensors, plant information sensors, and soil sensors.

The weather sensors are used to collect weather information and transmit the weather information to the analyzer.

The soil sensors are used to collect soil moisture information and transmit the soil moisture information to the analyzer.

The monitoring sensors are used to collect plant images and transmit the plant images to the analyzer.

The plant information sensors are used to collect plant transpiration rates and leaf thicknesses.

The analyzer is used to analyze the plant images, the plant transpiration rates and the plant leaf thicknesses to obtain a plant type and a plant growth state, and determine an irrigation scheme according to the weather information, the soil moisture information, the plant type, the plant growth state, and a preset irrigation rule, and transmit the irrigation scheme to the controller.

The controller is used to regulate the irrigation equipment according to the irrigation scheme.

In an embodiment, the weather information includes air temperature, air humidity, and atmospheric pressure.

In an embodiment, the soil moisture information includes information of soil water, soil temperature, and soil humidity.

In an embodiment, the analyzer performs preprocessing, feature extraction and type identification on the plant images, to obtain the plant type, stem deformations, leaf areas, and leaf colors, then to obtain a leaf water potential and leaf water content information according to the leaf colors, the leaf areas, and the leaf thicknesses, and obtain the plant growth state according to the leaf water potential, the leaf water content information, the stem deformations, and the plant transpiration rates.

In an embodiment, the irrigation scheme includes irrigation time, irrigation water volume, and an irrigation mode.

In an embodiment, the irrigation rule includes different irrigation schemes corresponding to irrigation categories established by irrigation classification according to plant types, plant growth states, soil drought degrees, and weather information.

In an embodiment, the system further includes an information terminal. The analyzer is further used to enlarge plant leaves to analyze whether there is a disease-spot-containing image, analyze a disease-spot and proposes a solution when there is the disease-spot-containing image, and transmit the solution and the disease spot image to the information terminal.

In an embodiment, the system further includes an information terminal, and the analyzer is further used to extract weed information from the plant images and transmit the weed information to the information terminal.

An irrigation method based on computer vision monitoring, applied to the system, includes:
collecting soil moisture information, weather information, plant transpiration rates, leaf thicknesses, and plant images;
obtaining a plant type and a plant growth state based on the plant images, the transpiration rates, and the plant leaf thicknesses;
determining an irrigation scheme based on the weather information, the soil moisture information, the plant type, the plant growth state, and a preset irrigation rule; and
regulating the irrigation equipment based on the irrigation scheme.

Compared with the related art, the disclosure has the following beneficial effects.

The disclosure detects the weather information, the soil information, the plant images, the plant transpiration rates and the leaf thicknesses in real time through the collector, and the analyzer processes the plant images, the plant transpiration rates and the leaf thicknesses to thereby obtain the plant type and the plant growth state, and performs identification and analysis from aspects of plants, soil, air and so on, so as to obtain the best irrigation time, irrigation water volume and water-saving irrigation mode of plants, which effectively improve the utilization rate of water resources and improve the reliability of irrigation system. The scientific and accurate irrigation system in the disclosure can improve the effective irrigation proportion of farmland and the output of agricultural products.

In addition, through the collection of plants and soil information, the state of plants and soil can be effectively identified, and effective irrigation can be carried out according to different conditions of plants and soil. Effective irrigation modes can also be adopted for areas with large differences.

Moreover, in addition to providing irrigation modes, the disclosure can also detect plant diseases and inspect pests through computer identification technology, and can more effectively ensure the normal growth of plants.

Furthermore, the disclosure can also identify the surrounding weeds, and can more effectively ensure the normal growth of plants.

DETAILED DESCRIPTION OF EMBODIMENTS

Figure 1:
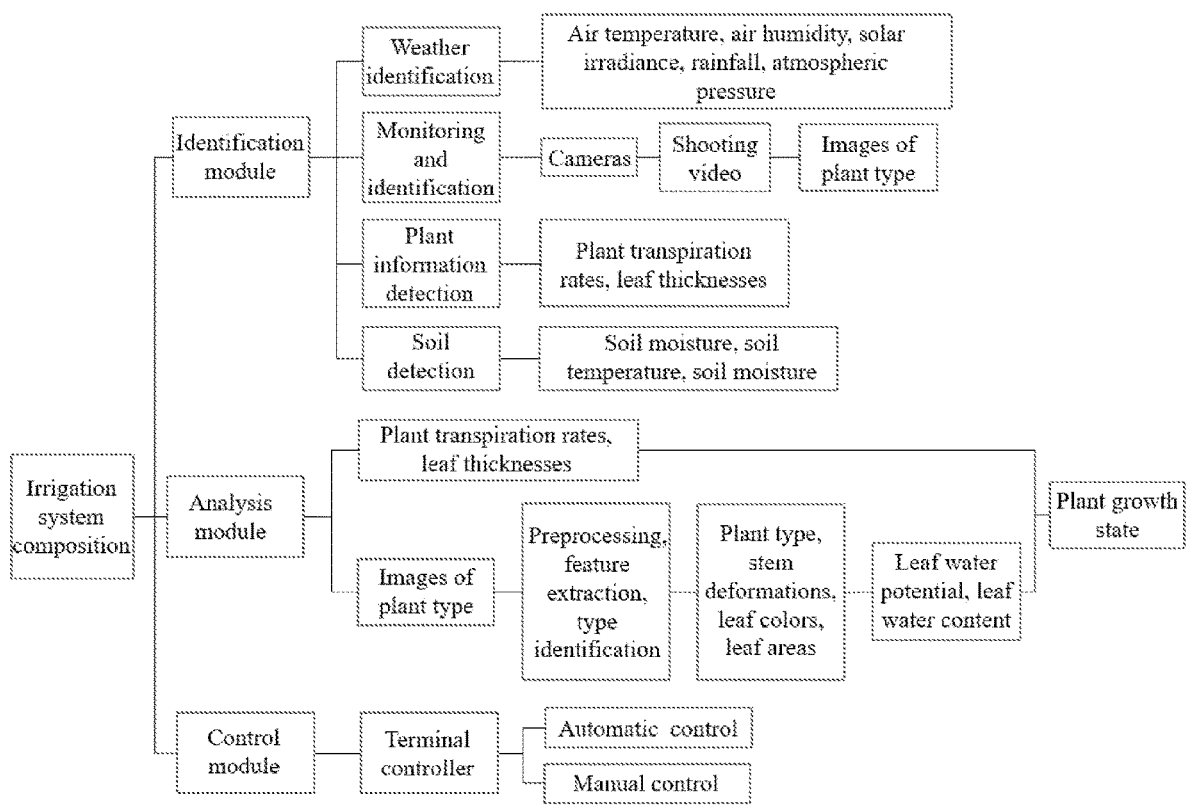
FIG. 1 is a schematic structural diagram of an irrigation control system based on computer vision monitoring.
Figure 2:
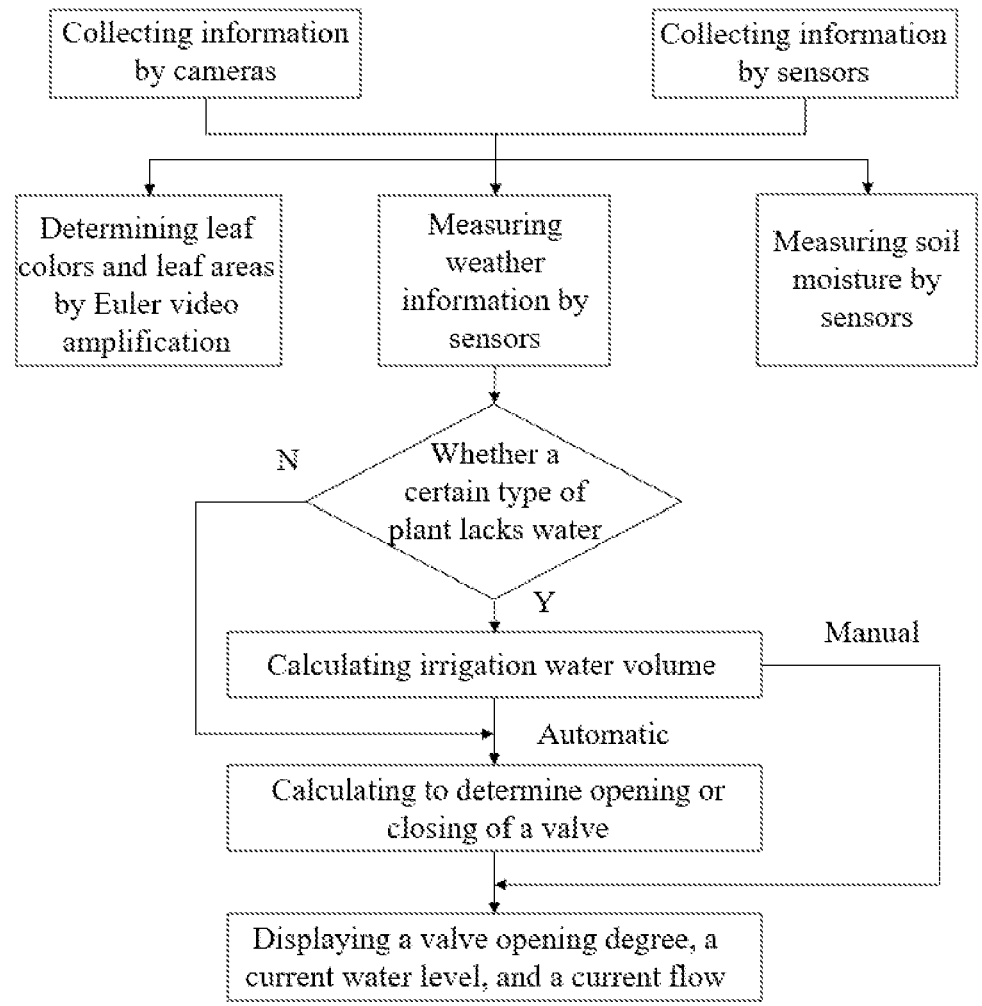
FIG. 2 is a schematic flowchart of a method using the irrigation control system based on computer vision monitoring.

In order to further understand the disclosure, the following descriptions of the disclosure is provided in conjunction with embodiments which are intended to further explain features and advantages of the disclosure and are not intended to limit the claims of the disclosure.

An irrigation system based on computer vision monitoring includes a collector, an analyzer, and a controller.

The collector may include weather sensors (also referred to as weather identification module), monitoring sensors (also referred to as monitoring and identification module), soil sensors (also referred to as soil detection module), and plant information sensors (also referred to as plant information detection module). A detection platform is installed in the irrigation area, preferably at a height of 3 meters (m).

The weather sensors are used to collect real-time weather information and transmit the weather information to the analyzer, include a temperature and humidity sensor, a solar irradiance sensor (also referred to as pyranometer), a rain gauge, and an atmospheric pressure sensor (also referred to as barometric pressure sensor). The weather sensors are preferably arranged at a position of 1.5 m of the detection platform to collect air temperature, air humidity, solar irradiance, rainfall, and atmospheric pressure in real time. The temperature and humidity sensor is preferably a YIFAN sensor with a temperature measurement range of −40° C. to 125° C. and a humidity measurement range of 0 to 100% RH (i.e., abbreviation for relative humidity) (° C.). The solar irradiance sensor is preferably an RS485 sensor, with a working temperature in a range of −25° C. to 60° C. The rain gauge is preferably a RS485 rain gauge for rainfall collection, with a working temperature in a range of −40° C. to 60° C. The atmospheric pressure sensor is preferably a RS485 type, with an absolute measurement range of 0 to 120 kilopascals (kPa) and a working temperature in a range of −40° C. to 80° C.

The soil sensors are used to collect environmental information of plants, that is, to collect soil moisture information and transmit the soil moisture information to the analyzer, include a soil water content sensor (also referred to as soil moisture sensor), a soil temperature sensor, and a soil humidity sensor to collect information of soil water content, soil temperature, and soil humidity respectively. The soil water content sensor adopts SWR-2 soil water content sensor, which is not only used for mobile measurement of soil moisture point source information, but also can be buried in the soil for fixed-point long-term detection of soil water content. A measurement range of the soil water content sensor is 0~100%, and its accuracy is 2%. A type of the soil temperature sensor used is JS-ST10, with a measurement range of −30° C. to 70° C., and its measurement accuracy can reach to ±0.2° C. The soil humidity sensor is FDS100 soil humidity sensor, and its measurement humidity range is 0~70.6%.

The plant information sensors include a crop transpiration detector and displacement sensors. The crop transpiration detector adopts a plant transpiration detector SYS-3080C, which can monitor plant transpiration rates in real time. The displacement sensors are used to measure thicknesses of plant leaves, and the sensors may be clamped on the leaves.

The monitoring sensors are used to collect plant images, including cameras. The monitoring sensors are mainly used for accurately measuring plants based on the computer vision technology, a computer sends a shooting command, the cameras automatically focus and shoot the plants after receiving the shooting command, and transmit picture information back to the computer through a wireless network. The cameras are preferably installed at 2.8 m above the detection platform, and a canopy is set on a top of the cameras to prevent rainwater from dripping into the cameras and affecting the shooting effect. The monitoring sensors collect plant leaf images in the following way: shooting plants in a certain area through the installed cameras; transmitting the images to the analyzer through the wireless network; and performing a series of processing and analysis steps of preprocessing, feature extraction, type identification and the like on the images by the analyzer. Its purpose is to identify a plant growth state, and also to identify weeds around the plants. The cameras are located on an upper part of the detection platform, and its installation height is preferably 2.8 m. The camera is preferably HIKVISION-E12A, with a field angle in a range of 87 to 95 degrees, a focal length in a range of 4 to 8 millimeters (mm), and an external dimension of 80.16*48.6*42.18 mm. For the calculation of a shooting range of the cameras, if a field of view of the lens is 85 degrees and the installation height H of the cameras is 2.8 m, then the shooting area of a single camera is:

$$\text{Shooting radius: } R = H\tan\left(\frac{\alpha}{2}\right) = 2.8 \times \tan\left(\frac{87°}{2}\right) = 2.66 \text{ m}$$

$$\text{Shooting area: } S = \pi R^2 = 3.14 \times 2.66 \times 2.66 = 22.22 \text{ m}^2$$

Therefore, the shooting radius is 2.66 m and the shooting area is 22.22 square meters (m²).

In order to make all areas within the shooting range, the distance between detection platforms should be set to be 5 m.

The analyzer is mainly a computer and imports the collected air temperature, air humidity, solar irradiance, rainfall, atmospheric pressure, soil water content, soil temperature, soil humidity, plant transpiration rates, leaf thicknesses, and plant images into the computer. The computer determines the degree of soil drought according to soil water content, soil temperature and soil humidity, and determines whether a normal range required for plant growth is reached based on air temperature, air humidity, solar irradiance, rainfall, and atmospheric pressure. The computer performs a series of analysis steps of preprocessing, feature extraction and type identification on the received plant image by using an Euler video amplification method to obtain a plant type, stem deformations, leaf areas, leaf colors or reflectivity, obtains a leaf water potential and leaf water content information according to the plant leaf colors, the leaf areas and the leaf thicknesses, determines whether the plant water content meets requirements of normal growth, and obtains a plant growth state according to the leaf water potential, the leaf water content information, the stem deformations, the plant transpiration rates. Based on the degree of soil drought, the weather information, the plant type and the plant growth state, the computer further analyzes whether the plants are water-deficient, and determines an irrigation scheme according to a preset irrigation rule, in which the irrigation scheme includes irrigation time, irrigation volume and an irrigation mode. The irrigation rule refers to different irrigation schemes corresponding to irrigation categories established by irrigation classification based on soil types, irrigation water sources, irrigation modes, plant types, and plant growth states, soil drought degrees, and weather information in different regions. The computer enlarges the plant leaves, analyzes whether there is a disease-spot-containing image, and checks whether there is a wormhole on the leaf surface. If there is a relevant problem, the computer analyzes a disease-spot and proposes a solution, and transmits the solution and the disease-spot-containing image to the information terminal. The manager takes corresponding measures to solve the problem according to the provided solution and information of the disease-spot-containing image. In addition, the computer can extract weeds from the surrounding environment images, providing a basis for weed identification.

Most of water of plants is borne by leaf surfaces, and water shortage will lead to the shrinkage of plant leaves, the reduction of area and the short-term deepening of color. Water moves along a gradient of water potential, and many responses of plants to water deficit are related to leaf water potential. Leaf water potential mainly reflects the osmotic potential of plants. When the plant water potential and turgor pressure are reduced enough to interfere with normal functions of plants, water deficit will occur. Therefore, the leaf water potential is considered to be the best measure of plant water state. The leaf water potential is the energy level of water molecules in leaf cell snap, which has a more obvious manifestation of plant water shortage. The leaf water potential is affected by both water absorption and transpiration of plants. Under the action of transpiration, the leaf water content decreased, the leaf water potential decreased, and the water potential gradient of plant leaf surface and root soil increased. The measurement of leaf water potential is mainly related to leaf thickness. The computer Euler video amplification technology is used to monitor leaf thicknesses, leaf areas and leaf colors, and the water shortage of plants is detected according to the leaf thicknesses. There is a certain functional relationship between the leaf thickness and the water content, which can be used to diagnose whether there is water deficit in plants. There is a close relationship between leaf color characteristics, leaf area and leaf water content.

After obtaining the irrigation scheme from the analyzer, the controller schedules the irrigation equipment according to the irrigation scheme, and controls and adjusts the irrigation water volume, irrigation time and irrigation mode. The choices of irrigation modes may include: drip irrigation, sprinkler irrigation, and micro-sprinkler irrigation. The drip irrigation is a common irrigation mode that uses water droplets to water the soil, which can meet the needs of some crops for watering. The advantage of drip irrigation is that it can save water resources and reduce the problem of soil hardening. The sprinkler irrigation adopts a mode of pressure spraying, which uses pressure to spray water over the land that needs to be watered, and then forms small water droplets, which are then vertically scattered down into the land due to the effect of gravity to realize water irrigation. Its range is large, so it covers a wide range. The sprinkler irrigation is suitable for large lawns, but not suitable for irrigation of water-loving crops. The micro-sprinkler irrigation is a spray irrigation form of droplets, which is common in flower growers. It can not only keep the humidity of the greenhouse, but also keep the water suitable for each irrigation. After the relevant processing of the information collected by a front-end identifier, relevant control commands need to be transmitted to the controller in the form of information through the wireless network. When the water is found to be insufficient, a command is sent to open a valve of the irrigation pipeline to supply water to the plants, and when the water is confirmed to be sufficient, the valve is closed in time to stop supplying water, so as to achieve the purpose of saving water. The valve is an intelligent 9500 solenoid valve, with a flow range of 3.41~34.1 cubic meters per hour (m³/h) and an overall dimension of 171 mm×140 mm×302 mm (Type 9515).

On the application platform, users can receive soil drought information and weather information through mobile phones, computers and other information terminals, and can remotely control the irrigation equipment. For the management of government departments, the comprehensive management level of agricultural conditions, agrometeorology and agricultural water conservancy can be improved through this platform.

The method of the disclosure includes steps as follows.

Firstly, the collector collects environmental information of plants, and the sensors installed in different areas measure soil water, humidity and temperature, and collect soil moisture. The weather sensors identify the surrounding air temperature, humidity, atmospheric pressure, solar irradiance, rainfall, and obtains real-time weather information. The plant information sensors collect plant transpiration rates and leaf thicknesses. The cameras collect plant images and transmits the plant images back to the computer.

Then all the measured information enters the analyzer, the analyzer analyzes the soil water content according to the environmental information of plants, determines the degree of soil drought, and analyzes whether the soil water content, air temperature, air humidity, solar irradiance, rainfall and atmospheric pressure meet the normal range required for plant growth. The computer performs a series of analysis steps of preprocessing, feature extraction, and type identification on the received plant images to obtain a plant type, canopy temperature, stem deformations, leaf areas, and leaf colors or reflectivity. The computer obtains leaf water potential and leaf water content information according to the plant leaf colors, the leaf areas, and the leaf thicknesses, and determines whether the water content of plants meets their normal growth according to the leaf water potential, the leaf water content information, the plant transpiration rates, the stem deformations, to thereby obtain the plant growth state. An irrigation scheme is determined according to the degree of soil drought, the weather information, the plant type, the plant growth state and a preset irrigation rule, which is formed a control command after relevant processing, and the control command is transmitted to the controller in the form of information through the wireless network. The flow can be controlled by manual adjustment and automatic adjustment, and the automatic adjustment is commanded by the computer to control the irrigation volume of the irrigation equipment. For the manual adjustment, the solenoid pilot valve needs to be loosened, the standard configuration has the function of flow adjustment, and adjust the flow when necessary. Otherwise, remove the handle to prevent human error operation. The computer enlarges the plant leaves to analyze whether pests and diseases problems exit, analyzes the pests and diseases problems and proposes a solution if the related problems exist, transmits the solution and the disease-spot-containing images to an information terminal, and a manager takes corresponding measures to solve the problems according to the provided information. In addition, the computer can extract weeds from the surrounding environment images, providing a basis for weed identification.

What is claimed is:

1. An irrigation system based on computer vision monitoring, comprising a collector, an analyzer, a controller, irrigation equipment, and detection platforms;
   wherein the detection platforms are installed in an irrigation area, a distance between the detection platforms is 5 m, and a height of each of the detection platforms is 3 m;
   wherein the collector comprises weather sensors, monitoring sensors, plant information sensors, and soil sensors; the weather sensors are configured to collect weather information and transmit the weather information to the analyzer and are respectively arranged in positions of 1.5 m from the detection platforms; the soil sensors are configured to collect soil moisture information and transmit the soil moisture information to the analyzer; the monitoring sensors are configured to collect plant images and transmit the plant images to the analyzer, the monitoring sensors comprise cameras, and the cameras are installed at 2.8 m above the detection platforms; and the plant information sensors are configured to collect plant transpiration rates and plant leaf thicknesses;
   wherein the analyzer is configured to: use an Euler video amplification method perform preprocessing, feature extraction, and type identification on the plant images to obtain a plant type, stem deformations, leaf areas and leaf colors; obtain leaf water potentials and leaf water content information according to the leaf colors, the leaf areas and the leaf thicknesses; obtain a plant growth state according to the leaf water potentials, the leaf water content information, the stem deformations and the plant transpiration rates; determine an irrigation scheme according to the weather information, the soil moisture information, the plant type, the plant growth state, and a preset irrigation rule; and transmit the irrigation scheme to the controller; and
   wherein the controller is configured to regulate the irrigation equipment according to the irrigation scheme.

2. The irrigation system according to claim 1, wherein the weather information comprises air temperature, air humidity, solar irradiance, rainfall, and atmospheric pressure.

3. The irrigation system according to claim 1, wherein the soil moisture information comprises information of soil water content, soil temperature, and soil humidity.

4. The irrigation system according to claim 1, wherein the irrigation scheme comprises irrigation time, irrigation water volume, and an irrigation mode.

5. The irrigation system according to claim 1, wherein the preset irrigation rule comprises different irrigation schemes corresponding to irrigation categories established by irrigation classification according to plant types, plant growth states, soil drought degrees, and weather information.

6. The irrigation system according to claim 1, further comprising an information terminal, wherein the analyzer is further configured to enlarge plant leaves to analyze whether there is a disease-spot-containing image, analyze a disease-spot and propose a solution when there is the disease-spot-containing image, and transmit the solution and the disease-spot-containing image to the information terminal.

7. The irrigation system according to claim 1, further comprising an information terminal, wherein the analyzer is further configured to extract weed information from the plant images and transmit the weed information to the information terminal.

8. An irrigation method based on computer vision monitoring, applied to the irrigation system according to claim 1, comprising:
   collecting the soil moisture information, the weather information, the plant transpiration rates, the plant leaf thicknesses, and the plant images;
   obtaining the plant type and the plant growth state based on the plant images, the plant transpiration rates, and the plant leaf thicknesses;
   determining the irrigation scheme based on the weather information, the soil moisture information, the plant type, the plant growth state, and a preset irrigation rule; and
   regulating the irrigation equipment based on the irrigation scheme.

9. An irrigation system based on computer vision monitoring, comprising a collector, an analyzer, a controller, and irrigation equipment;
   wherein the collector comprises weather sensors, monitoring sensors, plant information sensors, and soil sensors; the weather sensors are configured to collect weather information and transmit the weather information to the analyzer; the soil sensors are configured to collect soil moisture information and transmit the soil moisture information to the analyzer; the monitoring sensors are configured to collect plant images and transmit the plant images to the analyzer; and the plant information sensors are configured to collect plant transpiration rates and plant leaf thicknesses;
   wherein the analyzer is configured to analyze the plant images, the plant transpiration rates and the plant leaf thicknesses to obtain a plant type and a plant growth state, determine a target irrigation scheme according to the weather information, the soil moisture information, the plant type, the plant growth state, and a preset irrigation rule, and transmit the target irrigation scheme to the controller; and the preset irrigation rule comprises different irrigation schemes corresponding to irrigation categories established by irrigation classification according to plant types, plant growth states, soil drought degrees, and weather information;

wherein the controller is configured to regulate the irrigation equipment according to the target irrigation scheme; and wherein the irrigation system further comprises an information terminal, the analyzer is further configured to enlarge plant leaves to analyze whether there is a disease-spot-containing image, analyze a disease-spot and propose a solution when there is the disease-spot-containing image, and transmit the solution and the disease-spot-containing image to the information terminal, to thereby make a manager take a corresponding measure to solve the disease-spot based on the solution and the disease-spot-containing image.

* * * * *